United States Patent
Ortiz et al.

(10) Patent No.: US 9,846,918 B2
(45) Date of Patent: Dec. 19, 2017

(54) ELECTRIC VEHICLE RESCUE SYSTEM

(71) Applicants: Luis M. Ortiz, Albuquerque, NM (US); Kermit D. Lopez, Albuquerque, NM (US)

(72) Inventors: Luis M. Ortiz, Albuquerque, NM (US); Kermit D. Lopez, Albuquerque, NM (US)

(73) Assignee: Mesa Digital, LLC, Albuquerque, NM (US)

( * ) Notice: Subject to any disclaimer, the term of this patent is extended or adjusted under 35 U.S.C. 154(b) by 146 days.

(21) Appl. No.: 15/080,705

(22) Filed: Mar. 25, 2016

(65) Prior Publication Data

US 2016/0311357 A1  Oct. 27, 2016

Related U.S. Application Data

(60) Provisional application No. 62/138,688, filed on Mar. 26, 2015.

(51) Int. Cl.
| | | |
|---|---|---|
| B60P 1/04 | (2006.01) | |
| G07C 5/00 | (2006.01) | |
| G06Q 50/30 | (2012.01) | |
| H02J 7/00 | (2006.01) | |
| B60P 1/00 | (2006.01) | |
| G06Q 20/14 | (2012.01) | |
| G07C 5/08 | (2006.01) | |
| B60L 11/18 | (2006.01) | |
| B60P 3/12 | (2006.01) | |

(52) U.S. Cl.
CPC .......... *G06Q 50/30* (2013.01); *B60L 11/1816* (2013.01); *G06Q 20/14* (2013.01); *G07C 5/008* (2013.01); *G07C 5/0808* (2013.01); *H02J 7/0054* (2013.01); *B60P 3/12* (2013.01)

(58) Field of Classification Search
CPC ... G07C 5/0808; G07C 5/008; B60L 11/1816; H02J 7/0054; G06Q 20/14; G06Q 50/30
USPC .......................................................... 320/104
See application file for complete search history.

(56) References Cited

U.S. PATENT DOCUMENTS 3,599,811 A * 8/1971 Watkins ................ B60P 1/5428
414/430
6,882,917 B2 * 4/2005 Pillar et al. ............ A62C 27/00
180/65.27

(Continued)

*Primary Examiner* — Sun Lin
(74) *Attorney, Agent, or Firm* — Luis M. Ortiz; Kermit D. Lopez; Ortiz & Lopez, PLLC

(57) ABSTRACT

An electrical vehicle (EV) rescue vehicle includes a mobile platform, which further includes a winch and a ramp. The mobile platform of the EV rescue vehicle is deployable for retrieving a disabled EV (a "rescued vehicle") thereon with the winch and the ramp and for transportation of the disabled EV. A charging unit is associated with said mobile platform for connecting and charging of the disabled EV, either on a fixed location or during transport. A systems analysis module can be included with the system for testing a functionality of systems and components of the disabled EV and providing results of the testing to customers. The mobile platform can be provided as an EV rescue vehicle in a form of a trailer pulled by another vehicle or integrated with another vehicle (e.g., a truck). The EV rescue vehicle can also carry passengers associated with the disabled EV when the disabled EV is being transported, charged, and/or analyzed by the EV rescue vehicle.

17 Claims, 2 Drawing Sheets

(56) References Cited

U.S. PATENT DOCUMENTS

| | | | | |
|---|---|---|---|---|
| 7,392,122 B2* | 6/2008 | Pillar et al. | ............ | A62C 27/00 701/22 |
| 7,756,621 B2* | 7/2010 | Pillar et al. | ............ | A62C 27/00 701/22 |
| 8,905,177 B2* | 12/2014 | Grossman et al. | .... | B62D 59/04 180/198 |
| 8,963,481 B2* | 2/2015 | Prosser et al. | ........ | H02J 7/0054 320/103 |
| 9,007,020 B2* | 4/2015 | Prosser et al. | ........ | H02J 7/0054 320/104 |
| 2015/0175022 A1* | 6/2015 | Storm et al. | ........ | B60L 11/1824 320/109 |

* cited by examiner

ELECTRIC VEHICLE RESCUE SYSTEM

INVENTION PRIORITY

This patent application is a continuation of and claims priority to U.S. Provisional Patent Application Ser. No. 62/138,688, filed Mar. 26, 2015, entitled "Electric Vehicle Rescue System", which is hereby incorporated by reference in its entirety.

TECHNICAL FIELD

Embodiments are related to systems and methods for charging, analyzing, and otherwise providing roadside assistance to stranded electric vehicles.

BACKGROUND

Electric vehicles are becoming widely accepted as a means of personal transportation. Vehicle manufacturers such as GM, Tesla, BMW, and others have been experiencing growth in sales and the market for electric vehicles. The concern voiced by many potential buyers of electric vehicles is that they may not be able to make it to the next charging station. Although several entities are working towards deploying charging stations throughout metropolitan areas, electric vehicle owners or would be owners still have concerns about running out of power.

There are companies that are providing rescue services to stranded electric vehicles using a flatbed (e.g., a flatbed trailer or a flatbed integrate with a vehicle) and winch to retrieve the electric vehicle onto the flatbed. The problem is that the electric vehicle will still be without power once it is towed to its destination.

SUMMARY

The present inventors believe there is need for a mobile electric vehicle rescue system than can tow a disabled electric vehicle (EV) and charge it during transport to its destination. The present inventors also believe that analysis of the electrical vehicle during transport can provide valuable information and service to customers requiring rescue. Retrieval, transport, charging, and analysis are features that can be offered to disabled vehicles as part of a roadside assistance program.

It is a feature of the present invention to provide an EV (Electrical Vehicle) rescue vehicle that includes a mobile platform including a winch and a ramp. The mobile platform of the rescue vehicle is deployable for retrieving a disabled EV (the "rescued vehicle") thereon with the winch and the ramp and for transportation of the EV.

It is another feature of the present invention to provide a charging unit in association with said mobile platform for connection to and charging of the EV, either on location or during transport of the EV.

It is yet another feature of the present invention to provide a systems analysis module in association with the EV rescue system for testing the functionality of systems and components of the EV. Results of analysis can be provided to customers.

It is another feature of the present invention that the mobile platform can be provided as a rescue vehicle in the form of a trailer pulled by another vehicle (e.g., pulled by a heavy duty truck) or integrated with another vehicle (e.g., the truck).

It is also a feature of the present invention that the rescue vehicle can also carry passengers associated with said EV as the EV is being transported, charged, and/or analyzed by the rescue vehicle.

It is also a feature of the present invention that a roadside assistance service can be provided via a network of independent providers connected to stranded EV customers using a mobile apple via a data network and based on physical location of the independent providers and the stranded customer making a request.

It is also a feature of the present invention that the rescue vehicle can include means for charging batteries associated with the rescue vehicle or the rescued vehicle. At least one PV panel can be associated with the mobile platform to charge batteries when a vehicle is not being transported. A generator associated with wheels of the rescue vehicle can generate power as the rescue vehicle is moving on a road or highway while transporting a rescued vehicle.

These and other features of the present invention will become apparent given the figures and detailed specification provided herein.

DETAILED DESCRIPTION OF PREFERRED EMBODIMENTS

Figure 1:
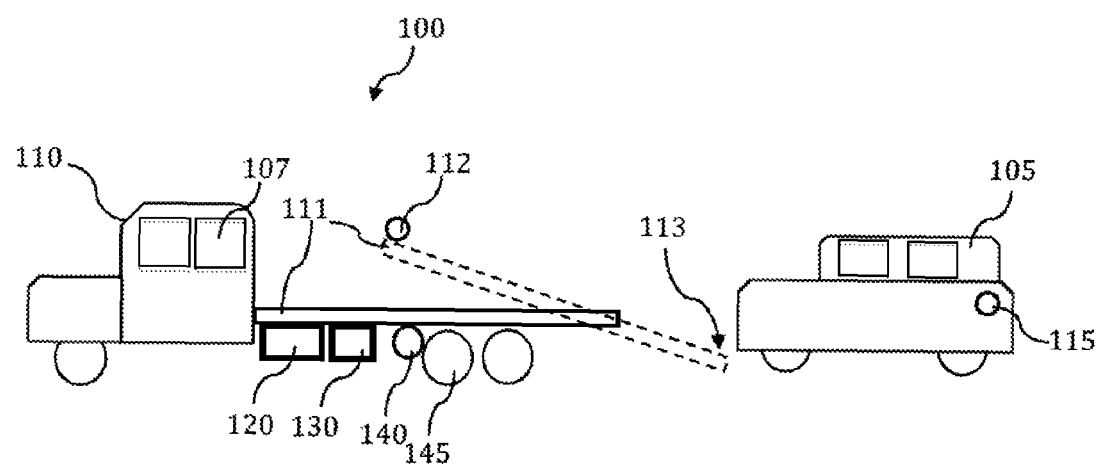
FIG. 1 illustrates a system in accordance with features of the present invention.

Referring to FIG. 1, an electric vehicle rescue system 100 is illustrated that can tow a disabled electric vehicle (EV) 105 and charge it during transport to a destination. The rescue system 100 can include a rescue vehicle 110 that includes a mobile platform 111 including a winch 112 and a ramp feature 113. The platform 111 can operate as the ramp by mechanized tilting of the platform 111 toward the ground in front of a disabled vehicle as shown by dashed lines in FIG. 1, or a separate ramp section (not shown) can be deployed from the platform. It is typical today for the entire platform to be manipulated away from the rear of a truck as a rescue vehicle 110 to place the platform 111 in front of a disabled vehicle 105 that is requiring towing or transportation. It is preferable today that the mobile platform 111 of the rescue vehicle 110 is deployable into an angled position in contact with the ground for retrieving a disabled EV 105 (as the "rescued vehicle") thereon by operation of a winch 112, which is typically connected to a tow hook, or the like, located near the front of a disabled vehicle 105 as the rescued vehicle is mechanically pulled onto the platform 111 by the winch 112. Once the rescued vehicle 105 is in place on the mobile platform 111, it is secured with straps or chains for transportation.

A charging unit 120 is included in association with the electric vehicle rescue system 100 for connection to and charging of the EV 105 by connection to the EV's connection port 115. Charging of the EV 105 can occur either on location or during transport of the EV on the mobile platform 111. A customer can be charged separately for charging and transportation, depending on the elected service.

A systems analysis module 130 can also be included in association with the an electric vehicle rescue system 100 for testing the functionality of systems and components of the EV 105, either on site or during transport of the EV 105 on the mobile platform 110. The system analysis module can be connected to a test port (not shown) that is typically provided in a compartment within the EV 105. Results of analysis can be provided to customers in printed form or electronically via a data network. A customer can also be charged separately for the analysis.

It should be appreciated that the mobile platform 111 can be provided as a rescue vehicle in the form of a trailer pulled by another vehicle (e.g., pulled by a heavy duty truck) or integrated with another vehicle (e.g., the truck 110 as shown). It should be appreciated that the electric vehicle rescue system 100 can also include the ability to carry passengers associated with said EV as the EV is being transported, charged, and/or analyzed by the rescue vehicle. For example, the mobile platform 111 can be integrated or installed onto the back of a heavy duty, four door 107 (e.g., crew cab) truck that can also function as a shuttle for paying passengers.

It is also a feature of the present invention that the rescue vehicle can include means for charging batteries associated with the rescue vehicle or the rescued vehicle. The means can include at least one PV panel associated with the mobile platform 110 to charge batteries when a vehicle is not being transported. A generator 140 can also be associated with at least one of the wheels 145 (or axles) of the rescue vehicle and can generate power as the rescue vehicle is moving on a road or highway while transporting a rescued vehicle. The time that it takes to charge an EV is dependent on the amount of amperage and power that can be provided by the charging system. There are currently Level 1, Level 2, and DC charging stations available at stationary locations. The DC charging stations, such as the 480 volt DC CHAdeMO fast charging stations, are the highest power systems available today, are a three-phase system, and can charge an EV as soon as 20-30 minutes; however, significant power must be generated to accomplish fast charge. On a mobile platform, a fast charge can also be accomplished if additional means for generating power as described herein are provided, and if a bank of batteries are available on the platform to transfer DC charging energy to the EV batteries. Any variation of solar panels, generators, and batteries can provide enhanced charging capabilities for the rescue vehicle.

Figure 2:
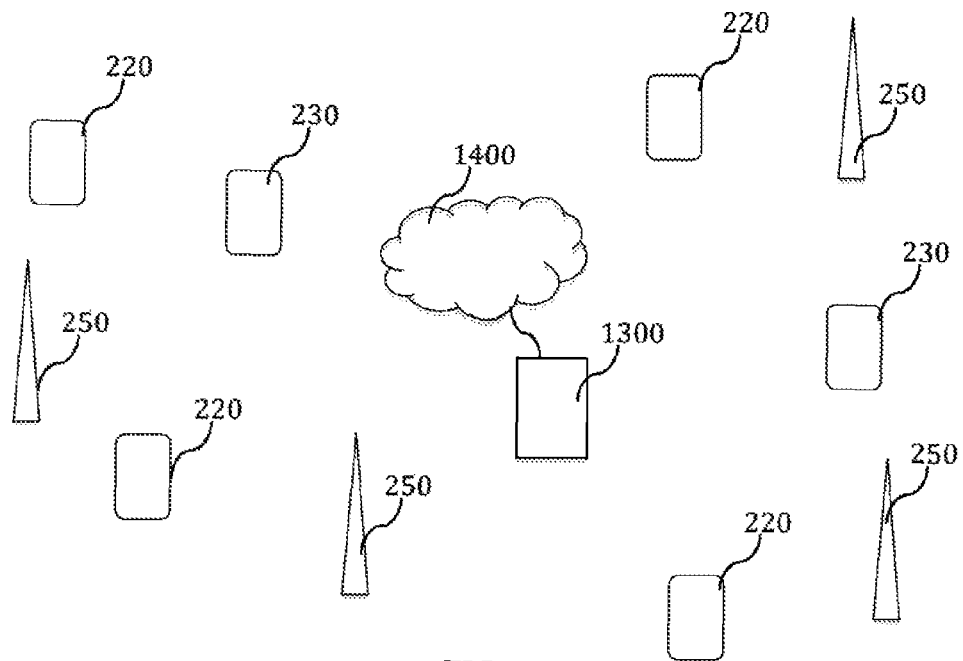
FIG. 2 illustrates a method of securing a rescue service by a customer in accordance with features of the present invention.

Retrieval, transport, charging, and analysis are features that can be offered to disabled vehicles as part of a roadside assistance program. Referring to FIG. 2, it is also a feature of the present invention that a roadside assistance service incorporated an electric vehicle rescue system 100 as described herein can be provided via a network of independent providers 230 that can be connected to stranded EV customers 220 using a mobile application accessed by providers and customers alike, and the provider and customer matching and transaction are managed by a remote server 1300 via a data network 1400 and matching is based on physical location (e.g., GPS, or triangulation based on cellular network towers 250) of the independent providers and the stranded customer making a request. Apps, such as UBER and LYFT are available on mobile devices to hire transportation from point A to point B for a customer. However, there is not a similar app that can match rescue vehicles with vehicles in need of rescue.

Figure 3:
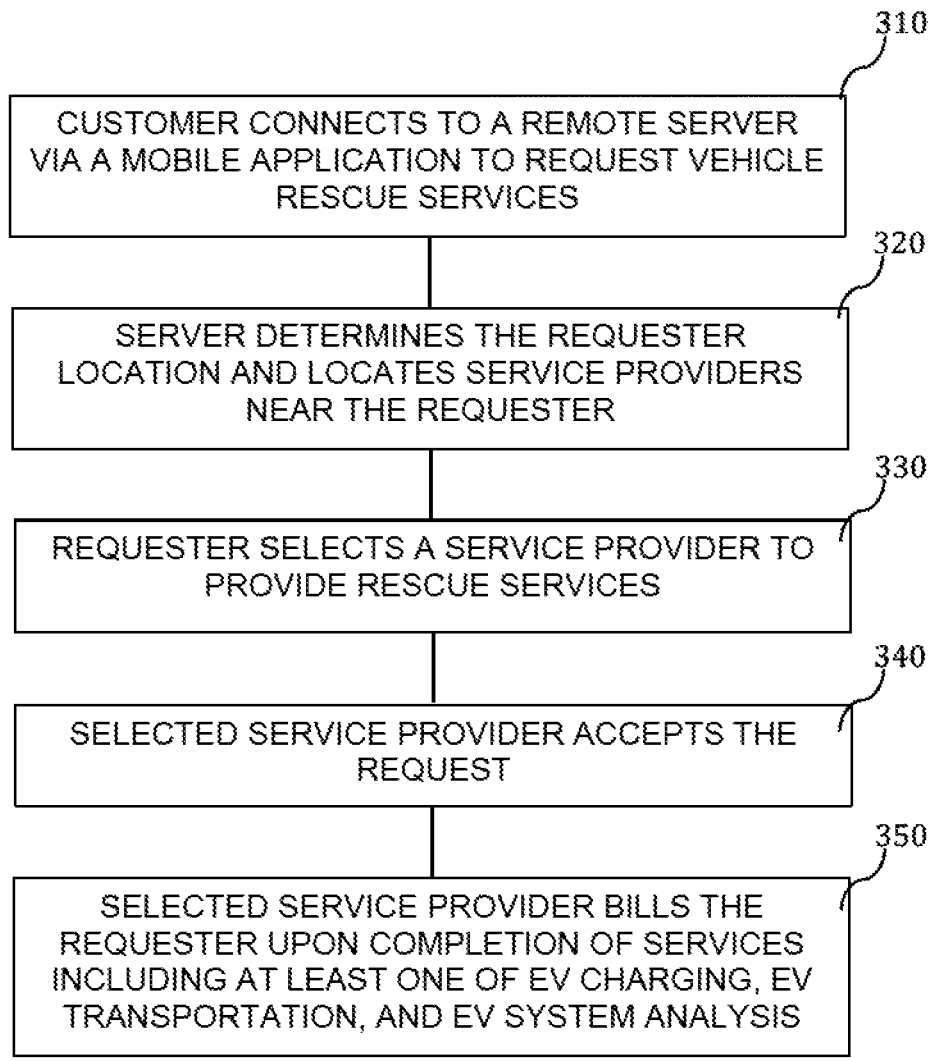
FIG. 3 illustrates a flow diagram for a process in accordance with features of the present invention.

Referring to FIG. 3, a method in accordance with features of the present invention is illustrated. Referring to block 310, a customer connects to a remote server via a mobile application to request vehicle rescue services. As shown in block 320, the server determines the requesters location and locates service providers near the requester. As shown in block 330, the requester selects a service provider to provide rescue services. As shown in block 340, the selected service provider accepts the request. Then as shown in block 350, the service provider bills the requester upon completion of services including at least one of EV charging, EV transportation, and EV analysis.

The invention claimed is:

1. A system for electric car rescue, said system comprising:
   a mobile platform including a winch and a ramp, said mobile platform deployable for retrieving an electric vehicle thereon with said winch and said ramp for transportation of said electric vehicle; and
   a charging unit associated with said mobile platform for connecting to said electric vehicle and for recharging said electric vehicle.

2. The system of claim 1 wherein said mobile platform comprises a trailer pulled by another vehicle.

3. The system of claim 2 wherein said another vehicle is adapted to carry passengers associated with said electric vehicle as said electric vehicle is being charged by said charging unit.

4. The system of claim 1 wherein said mobile platform is integrated with another vehicle.

5. The system of claim 4 wherein said another vehicle is adapted to carry passengers associated with said electric vehicle as said electric vehicle is being charged by said charging unit.

6. The system of claim 1 further comprising a systems analysis module for testing of a functionality of systems and components of said electric vehicle, wherein said systems analysis module connects to and electrically communicates with said electric vehicle.

7. The system of claim 6 wherein said systems analysis module communicates with a printing unit to render a report indicative of a result of said testing of said functionality of systems and components of said electric vehicle.

8. The system of claim 6 wherein said systems analysis module communicates wirelessly to a remote server through a wireless network to transmit data and results of said testing of said functionality of systems and components of said electric vehicle.

9. A system for electric car rescue, said system comprising:
   a truck including a mobile platform further comprising a winch and a ramp, said mobile platform deployable for retrieving an electric vehicle thereon with said winch and said ramp for transportation of said electric vehicle; and
   a charging unit associated with said mobile platform for connecting to said electric vehicle and for recharging said electric vehicle during transportation of said electric vehicle on said mobile platform.

10. The system 9 of claim wherein said mobile platform is integrated with another vehicle.

11. The system of claim 10 wherein said another vehicle is adapted to carry passengers associated with said electric vehicle as said electric vehicle is being charged by said charging unit.

12. The system of claim 9 further comprising a systems analysis module for testing of a functionality of systems and components of said electric vehicle, wherein said systems analysis module connects to and electrically communicates with said electric vehicle.

13. The system of claim 12 wherein said systems analysis module communicates with a printing unit to render a report indicative of a result of said testing of said functionality of systems and components of said electric vehicle.

14. The system of claim 12 wherein said systems analysis module communicates wirelessly to a remote server through a wireless network to transmit data and results of said testing of said functionality of systems and components of said electric vehicle.

15. A system for electric car rescue, said system comprising:
- a mobile platform including a winch and a ramp, said mobile platform deployable for retrieving an electric vehicle thereon with said winch and said ramp for transportation of said electric vehicle;
- a charging unit associated with said mobile platform for connecting to said electric vehicle and for recharging said electric vehicle; and
- a systems analysis module for testing of a functionality of systems and components of said electric vehicle, wherein said systems analysis module connects to and electrically communicates with said electric vehicle.

16. The system of claim 15 wherein said mobile platform comprises at least one of a trailer pulled by another vehicle or is integrated with another vehicle.

17. The system of claim 16 wherein said another vehicle is adapted to carry passengers associated with said electric vehicle as said electric vehicle is being charged by said charging unit.

* * * * *